(12) United States Patent
Kim et al.

(10) Patent No.: US 11,790,671 B2
(45) Date of Patent: Oct. 17, 2023

(54) VISION BASED LIGHT DETECTION AND RANGING SYSTEM USING MULTI-FIELDS OF VIEW

(71) Applicant: CRAZING LAB, INC., Sunnyvale, CA (US)

(72) Inventors: Sang-Pyo Kim, Los Altos, CA (US); Sreenivasa Kosireddy, Saratoga, CA (US)

(73) Assignee: Crazing Lab, Inc., Sunnyvale, CA (US)

( * ) Notice: Subject to any disclaimer, the term of this patent is extended or adjusted under 35 U.S.C. 154(b) by 207 days.

(21) Appl. No.: 17/063,437

(22) Filed: Oct. 5, 2020

(65) Prior Publication Data

US 2022/0108554 A1    Apr. 7, 2022

(51) Int. Cl.
| | |
|---|---|
| *G06V 20/64* | (2022.01) |
| *G01S 17/86* | (2020.01) |
| *G01S 17/66* | (2006.01) |
| *G01S 7/48* | (2006.01) |
| *G06V 10/145* | (2022.01) |
| *H04N 23/69* | (2023.01) |
| *G06V 30/24* | (2022.01) |

(52) U.S. Cl.
CPC .......... *G06V 20/647* (2022.01); *G01S 7/4802* (2013.01); *G01S 17/66* (2013.01); *G01S 17/86* (2020.01); *G06V 10/145* (2022.01); *H04N 23/69* (2023.01); *G06V 30/2504* (2022.01)

(58) Field of Classification Search
CPC .............. G06V 20/647; G06V 10/145; G06V 30/2504; G01S 7/4802; G01S 17/66; G01S 17/86; H04N 5/23296
See application file for complete search history.

(56) References Cited

U.S. PATENT DOCUMENTS

| | | | | |
|---|---|---|---|---|
| 8,421,003 B2* | 4/2013 | Fest | ...................... | F41G 7/2246 |
| | | | | 250/252.1 |
| 8,693,091 B2* | 4/2014 | Szabo | ................ | G02B 21/0032 |
| | | | | 359/384 |
| 8,996,207 B2* | 3/2015 | Goossen | .............. | G05D 1/0684 |
| | | | | 701/18 |
| 9,164,506 B1* | 10/2015 | Zang | ................... | G06F 3/04883 |
| 9,275,545 B2* | 3/2016 | Hart, Jr. | .................. | G08G 1/07 |

(Continued)

OTHER PUBLICATIONS

PCT International Search Report and Written Opinion, PCT Application No. PCT/US2021/045237, dated Nov. 26, 2021, 11 pages.

(Continued)

*Primary Examiner* — Philip P. Dang
(74) *Attorney, Agent, or Firm* — WTA Patents

(57) ABSTRACT

A vision based light detection and ranging (LIDAR) system captures images including a targeted object and identifies the targeted object using an object recognition model. To identify the targeted object, the vision based LIDAR system determines a type of object and pixel locations or a boundary box associated with the targeted object. Based on the identification, the vision based LIDAR system directs a tracking beam onto one or more spots on the targeted object and detects distances to the one or more spots. The vision based LIDAR system updates the identification of the targeted object based on the one or more determined distances.

20 Claims, 7 Drawing Sheets

(56) References Cited

U.S. PATENT DOCUMENTS

| | | | | |
|---|---|---|---|---|
| 9,383,753 | B1* | 7/2016 | Templeton | G01S 17/89 |
| 9,433,350 | B2* | 9/2016 | Schönborn | A61B 1/043 |
| 9,619,027 | B2* | 4/2017 | Sodhi | G06F 3/0304 |
| 9,660,418 | B2* | 5/2017 | Atiya | H01S 5/183 |
| 9,724,177 | B2* | 8/2017 | Levin | A61C 9/0053 |
| 9,781,378 | B2* | 10/2017 | Howe | H04N 5/77 |
| 10,969,785 | B2* | 4/2021 | Kim | G05D 1/024 |
| 11,035,935 | B2* | 6/2021 | Hinderling | G01S 7/4814 |
| 11,170,299 | B2* | 11/2021 | Kwon | G06V 20/56 |
| 11,357,593 | B2* | 6/2022 | Komp | A61B 1/00193 |
| 11,514,690 | B2* | 11/2022 | Wiggeshoff | G06V 20/647 |
| 2014/0267734 | A1* | 9/2014 | Hart, Jr. | G08G 1/07 |
| | | | | 348/149 |
| 2016/0274589 | A1 | 9/2016 | Templeton et al. | |
| 2017/0315564 | A1* | 11/2017 | Thomas | B64C 13/18 |
| 2018/0143302 | A1 | 5/2018 | Osiroff et al. | |
| 2019/0025833 | A1 | 1/2019 | Kim et al. | |
| 2019/0094981 | A1 | 3/2019 | Bradski et al. | |
| 2019/0293795 | A1* | 9/2019 | Wilmer | G01S 17/87 |
| 2020/0218979 | A1 | 7/2020 | Kwon et al. | |
| 2020/0330197 | A1* | 10/2020 | Esbech | A61C 9/0066 |
| 2022/0296930 | A1* | 9/2022 | Chen | A61N 5/1075 |

OTHER PUBLICATIONS

Taiwan Intellectual Property Office, Office Action, Taiwanese Patent Application No. 110130885, dated Aug. 4, 2022, seven pages, (with concise explanation of relevance).

* cited by examiner

VISION BASED LIGHT DETECTION AND RANGING SYSTEM USING MULTI-FIELDS OF VIEW

BACKGROUND

The present disclosure relates to using a vision based light detection and ranging (LIDAR) system for determining a distance to a targeted object and using the distance for object identification.

In a conventional method for identifying and tracking objects in an environment, an object recognition model is applied to an image of the environment. The object recognition model receives the image and identifies information in the image, such as types of objects present in the image and pixel locations or bounding boxes associated with the objects. The object recognition model may be various types of trained computer models, such as a neural network, that learns to identify various types of objects based on a training set of labelled images.

However, the ability of the object recognition model to accurately identify, locate, and track objects in an image is limited by a resolution of the image. When the image is captured by a wide view camera, the image covers a wide area of an environment, but the resolution of the image may be low. With the wide view camera, when an object is located beyond a threshold distance from the wide view camera, the image may not include a sufficient number of pixels representative of the object for the object recognition model to distinguish and track the object. However, if a narrow view camera is used instead of the wide view camera to capture the image, the resolution of the image may be improved but the field of view is narrower compared to the wide view camera and can only capture a few number of objects in the image.

SUMMARY

Embodiments relate to a vision based light detection and ranging (LIDAR) system that includes a plurality of cameras configured to capture images corresponding to different fields of view of an environment. The first FOV and the second FOV may include an overlap region such that the wide view camera and the narrow view cameras capture images of a same targeted object in the overlap region. A first image corresponding to the first FOV may provide context of the environment including the targeted object, while a second image corresponding to the second FOV covers a close up view of the targeted object with additional details associated with the targeted object that are not visible in the first image. The plurality of cameras permits an object recognition model of the vision based LIDAR system to identify the targeted object with improved accuracy by providing both a wide view image and a narrow view image of the targeted object. Based on at least one of the images, the object recognition model may make a preliminary identification of the targeted object (e.g., type of object) and determine pixel locations or a boundary box of the targeted object in the at least one of the images.

In one or more embodiments, after identifying the targeted object in the at least one of the images, the vision based LIDAR system determines a distance to the targeted object using a distance sensor. The distance sensor includes a beam emitter that emits a tracking beam and a photo detector that detects at least a portion of the tracking beam that is reflected by the targeted object to measure the distance to the targeted object. Based on the pixel locations or the boundary box of the targeted object, the vision based LIDAR system generates a control signal to adjust a beam scanner such that the tracking beam may be directed toward one or more spots on the targeted object. The distances to the one or more spots on the targeted object are determined by the distance sensor by detecting the portion of the emitted tracking beam that is reflected by the targeted object. Based on the determined distances, the object recognition model may update the identification, location, and motion trajectory of the targeted object. The distances may provide additional features associated with the targeted object that further improves the accuracy of the targeted object identification, location, and motion trajectory.

In one or more embodiments, the vision based LIDAR system processes one or more images captured by the plurality of cameras using an object recognition model and identifies a targeted object captured in at least one of the images. The vision based LIDAR system directs a tracking beam to one or more spots on the targeted object using a beam scanner that adjusts its orientation according to a tracking control signal. Based on the tracking beam, the vision based LIDAR system determines one or more distances to the one or more spots on the targeted object. The vision based LIDAR updates identification of the targeted object according to the one or more determined distances to the targeted object.

In one or more embodiments, when two or more of the images includes the targeted object, the vision based LIDAR system may select an image with a highest resolution of the targeted object for identification.

In one or more embodiments, the beam emitter of the distance sensor may generate the tracking beam with adjustable beam intensity according to a beam control signal. The beam intensity may be adjusted based on detected presence of candidate objects in the one or more images. The beam intensity may be adjusted based on object types associated with the candidate objects. For example, if presence of people is detected in the one or more images, the beam intensity may be set to a low intensity setting for eye safety.

In one or more embodiments, a first camera of the plurality of cameras has a first field of view and a second camera of the plurality of cameras has a second field of view within the first field of view.

In one or more embodiments, the beam scanner directs the tracking beam onto one or more spots of the targeted object, where the one or more spots form a grid. When the tracking beam is directed onto more than one spot of the targeted object, the vision based LIDAR system can determine depth information at different portions of the targeted object.

In one or more embodiments, the vision based LIDAR system may include an adjustable mirror in a path of light between one of the plurality of cameras and the targeted object. The adjustable mirror can adjust a field of view of the camera to capture an image of the targeted object.

In one or more embodiments, the tracking control signal used to control the beam scanner may be generated based one or more pixels in the at least one of the images corresponding to the one or more spots to be tracked using the tracking beam.

The figures depict embodiments of the present disclosure for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments relate to a vision based light detection and ranging (LIDAR) system that determines distances to one or more spots on a targeted object and uses the distances for object identification of the targeted object. The vision based LIDAR system captures images corresponding to different fields of view that at least partially overlap. An object recognition model is first used to identify the type of targeted object and determine pixel locations corresponding to the targeted object in one or more of the images. After identifying the pixel locations, the vision based LIDAR system directs a tracking beam onto the one or more spots on the targeted object to determine distances to the one or more spots on the targeted object. The distances to the one or more spots are provided to the object recognition model to update the identification of the targeted object.

A vision based LIDAR system described herein refers to a LIDAR system that detects objects in images captured by one or more cameras, and then directing a tracking beam onto one or more spots on the targeted object to determine distances to the one or more spots on the detected objects.

Figure 1A:
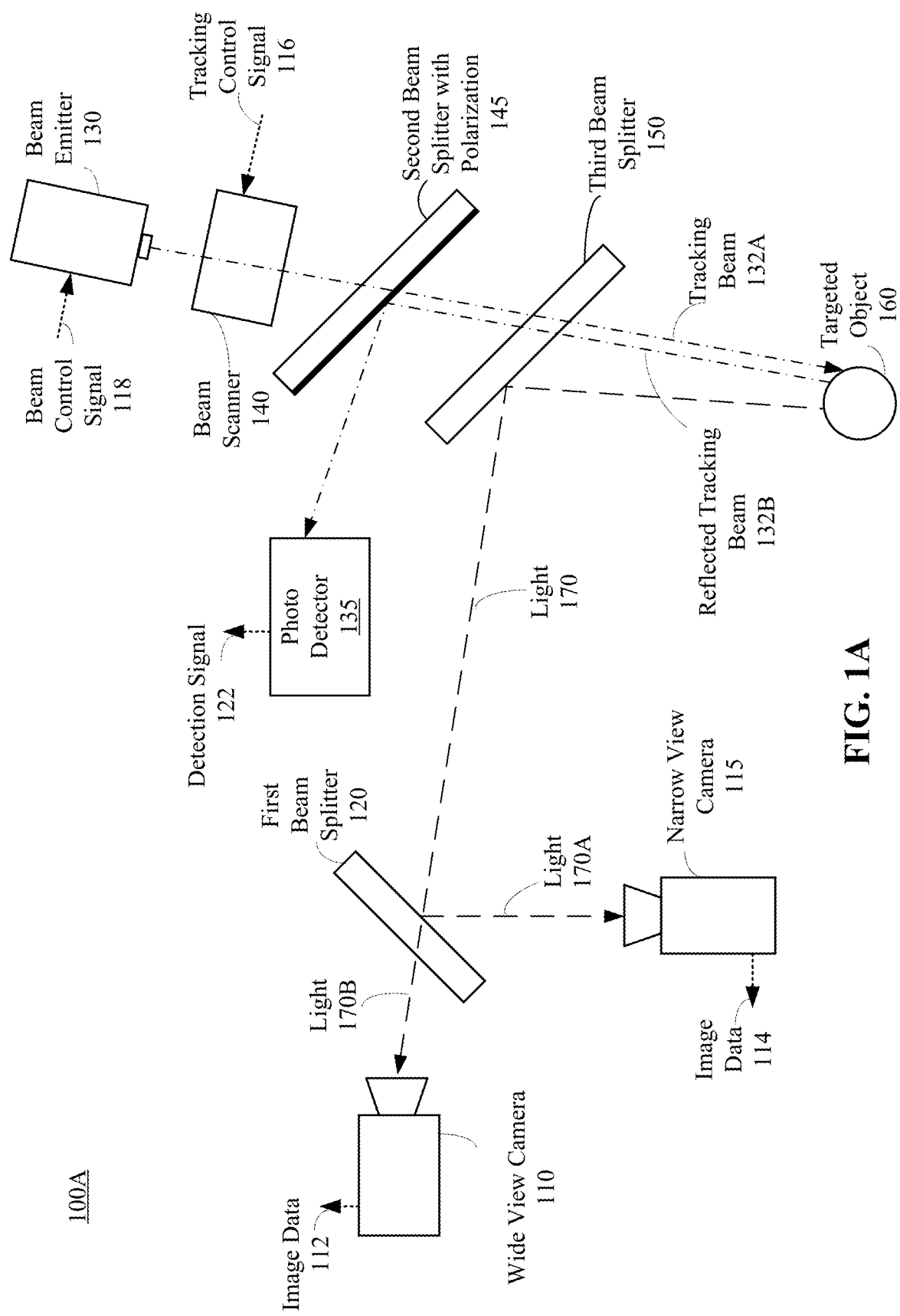
FIG. 1A is a schematic diagram of a vision based light detection and ranging (LIDAR) system including two cameras, in accordance with one embodiment.

FIG. 1A is a schematic diagram of a vision based light detection and ranging (LIDAR) system including two cameras, in accordance with one embodiment. The vision based LIDAR system 100A captures images of a targeted object 160 using at least one of a wide view camera 110 and a narrow view camera 115 (also collectively referred to as "cameras 110, 115"). The vision based LIDAR system 100A determines one or more distances to one or more different spots on the targeted object 160 using a tracking beam 132A. The tracking beam 132A permits the vision based LIDAR system 100A to determine depth information associated with the targeted object 160. The vision based LIDAR system 100A may include, among other components, the wide view camera 110, the narrow view camera 115, a first beam splitter 120, a beam emitter 130, a photo detector 135, a beam scanner 140, a second beam splitter with polarization 145, and a third beam splitter 150.

In some embodiments, the wide view camera 110 and/or the narrow view camera 115 have global shutters. Global shutters expose all pixels of the imaging sensors (e.g., CMOS sensors) simultaneously in a given frame in comparison to rolling shutters that generate a frame over a period by exposing a row of pixels at a time. Global shutters may provide more accurate results for identifying fast moving targeted objects 160 compared to rolling shutters. In other embodiments, the wide view camera 110 and/or the narrow view camera 115 have rolling shutters. Rolling shutters may allow the wide view camera 110 and/or the narrow view camera 115 to capture 200 frames or more per second which is greater than 60 frames or more per second of global shutters to reduce blurred effect in moving targeted objects 160.

The wide view camera 110 captures first images corresponding to a first field of view (FOV) and outputs image data 112 (also referred to herein as "images 112") corresponding to the first images. Similarly, the narrow view camera 115 captures second images corresponding to a second FOV narrower than the first FOV and outputs image data 114 (also referred to herein as "images 114") corresponding to the second images. The wide view camera 110 and the narrow view camera 115 have different observable areas. The wide view camera 110 can capture images 112 of a wider area compared to the narrow view camera, but the images 112 are lower in resolution compared to the images 114 captured using the narrow view camera 115. In comparison, the narrow view camera 115 can capture images 114 of a smaller area with higher resolution. In one example, the wide view camera 110 may cover an angle of view of 80 degrees while the narrow view camera 115 covers an angle of view of 3 degrees. The first FOV and the second FOV at least partially overlap. In some embodiments, the second FOV may correspond to a center region of the first FOV.

The wide view camera 110 and the narrow view camera 115 each receives a portion of light 170 representative of the targeted object 160. The light 170 may be ambient light that is reflected off the targeted object 160. After being reflected off the targeted object 160, the light 170 is reflected by the third beam splitter 150 and directed to the first beam splitter 120 that is configured to split the light 170 into a first portion 170A that enters the narrow view camera 115 and a second portion 170B enters the wide view camera 110. Because the wide view camera 110 and the narrow view camera 115 receive the same light 170, images captured simultaneously by the wide view camera 110 and the narrow view camera 115 may include pixels representing the same targeted object 160 although viewed from different perspectives.

The image data 112 from the wide view camera 110 and the image data 114 from the narrow view camera 115 may be provided to a processor (e.g., image signal processor 315) to be applied with an object detection model to identify candidate objects captured in the first images and the second images. The object detection model may identify the candidate objects and to determine pixel locations and/or boundary boxes of the candidate objects within the respective images. Details on the object detection model and generating control signs will be discussed below with respect to FIGS. 2-4.

The beam emitter 130 emits the tracking beam 132A according to a beam control signal 118. The beam emitter 130 may be a laser diode or a vertical cavity surface emitting laser (VCSEL). The beam emitter 130 may emit a single tracking beam 132A or emit multiple tracking beams 132A at a time. The beam control signal 118 causes the beam emitter 130 to adjust parameters of the tracking beam 132A such as emission length, frequency, and/or intensity.

The photo detector 135 detects a reflected tracking beam 132B after being reflected off a surface of the targeted object 160. In some embodiments, the photo detector 135 may be a photo diode or a single photon avalanche diode (SPAD). After the tracking beam 132A is emitted by the beam emitter 130, the tracking beam 132A is reflected by the targeted object 160 and the reflected tracking beam 132B enters the photo detector 135. A distance from the vision based LIDAR system 100A to the targeted object 160 may be determined, for example, by measuring elapsed time between a time at which the tracking beam 132A is emitted by the beam emitter 130 and a time at which the reflected tracking beam 132B is detected by the photo detector 135, using a conventional method that is well known in the art. The photo detector 135 may generate a detection signal 122 after detecting the reflected tracking beam 132B indicating a time of detection to be used in determining the distance.

The beam scanner 140 directs the tracking beam 132A emitted by the beam emitter 130 onto the targeted object 160 according to a tracking control signal 116. In some embodiments, the beam scanner 140 is a 2D galvanometer mirror or a 2D microelectromechanical system (MEMS) mirror. The beam scanner 140 may include one or more mirrors that change orientations based on the tracking control signal 116 to direct the tracking beam 132A to one or more spots on the targeted object 160 determined based on pixel locations of the targeted object 160 in the image data 112, 114. The tracking control signal 116 may represent variations in voltage supplied to an actuator in the beam scanner 140. For example, the beam scanner 140 may include one mirror that has a rotational axis along a horizontal axis and another mirror that has a rotational axis along a vertical axis. The combination of the two mirrors permits the beam scanner 140 to direct the tracking beam 132A in any direction in a 3-dimensional space, and the tracking control signal 116 may provide instructions to adjust the positions of the two mirrors to direct the tracking beam 132A to one or more spots on the targeted object 160. In another example, the beam scanner 140 may include one mirror that can rotate in multiple dimensions and direct the tracking beam 132A in any direction in a 3-dimensional space.

The beam scanner 140 can direct the tracking beam 132A precisely onto the targeted object 160 because it has fine angular resolution and fast response time. In one example, a mirror in the beam scanner 140 has an angular resolution of 0.025 degrees and a step response time of 100 µs. If the targeted object 160 is moving, the tracking control signal 116 can be updated such that the mirrors in the beam scanner 140 are adjusted to track the movement of the targeted object 160. In another example, a new targeted object 160 different from the current targeted object 160 may be selected for the vision based LIDAR system 100A to track, and the tracking control signal 116 may be updated to direct the tracking beam 132A onto the new targeted object 160 that corresponds to different pixel locations. In yet another example, the tracking beam 132A may be directed onto a plurality of spots on the targeted object 160 to determine distances to the plurality of different spots on the targeted object 160, which permits the vision based LIDAR system 100A to determine information such as depth, contours, and orientation of the targeted object 160 that is not available from two-dimensional image data 112, 114. The plurality of spots may form a grid on the targeted object 160, and the beam scanner 140 may be configured to direct the tracking beam 132A to the plurality of different spots according to the tracking control signal 116.

The second beam splitter with polarization 145 is an optical component that transmits the tracking beam 132A when incident upon a first surface and reflects the tracking beam 132B when incident upon a second surface that is opposite to the first surface. The second beam splitter with polarization 145 is placed within the vision based LIDAR system 100A such that the second beam splitter with polarization 145 is in a path of light between the beam emitter 130 and the targeted object 160 which partially overlaps with a path of light between the targeted object 160 and the photo detector 135. As shown in FIG. 1A, the tracking beam 132A that is directed onto the first surface of the second beam splitter with polarization 145 on the path between the beam emitter 130 and the targeted object 160 is transmitted. However, when the reflected tracking beam 132B on the path between the photo detector 135 and the targeted object 160 is incident upon the second surface of the second beam splitter with polarization 145, it is reflected at an angle. The second beam splitter with polarization 145 may have one or more filters for polarization applied to the second surface that causes the reflected tracking beam 132B to be reflected.

The tracking beam 132A passing through the second beam splitter with polarization 145 on its path to the targeted object 160 also passes through the third beam splitter 150. The third beam splitter 150 is disposed in the path of the tracking beam 132A between the beam emitter 130 and the targeted object 160. The third beam splitter 150 is also disposed in the path of the tracking beam 132A between the beam emitter 130 and the targeted object 160 that partially overlaps with the path of the reflected tracking beam 132B between the photo detector 135 and the targeted object 160. Additionally, the third beam splitter 150 is disposed in the path of the light 170 between the cameras 110, 115 and the targeted object 160. The third beam splitter 150 may have one or more filters to transmit the tracking beam 132A, 132B but reflect light 170 in the visible spectrum towards the cameras 110, 115.

Figure 1B:
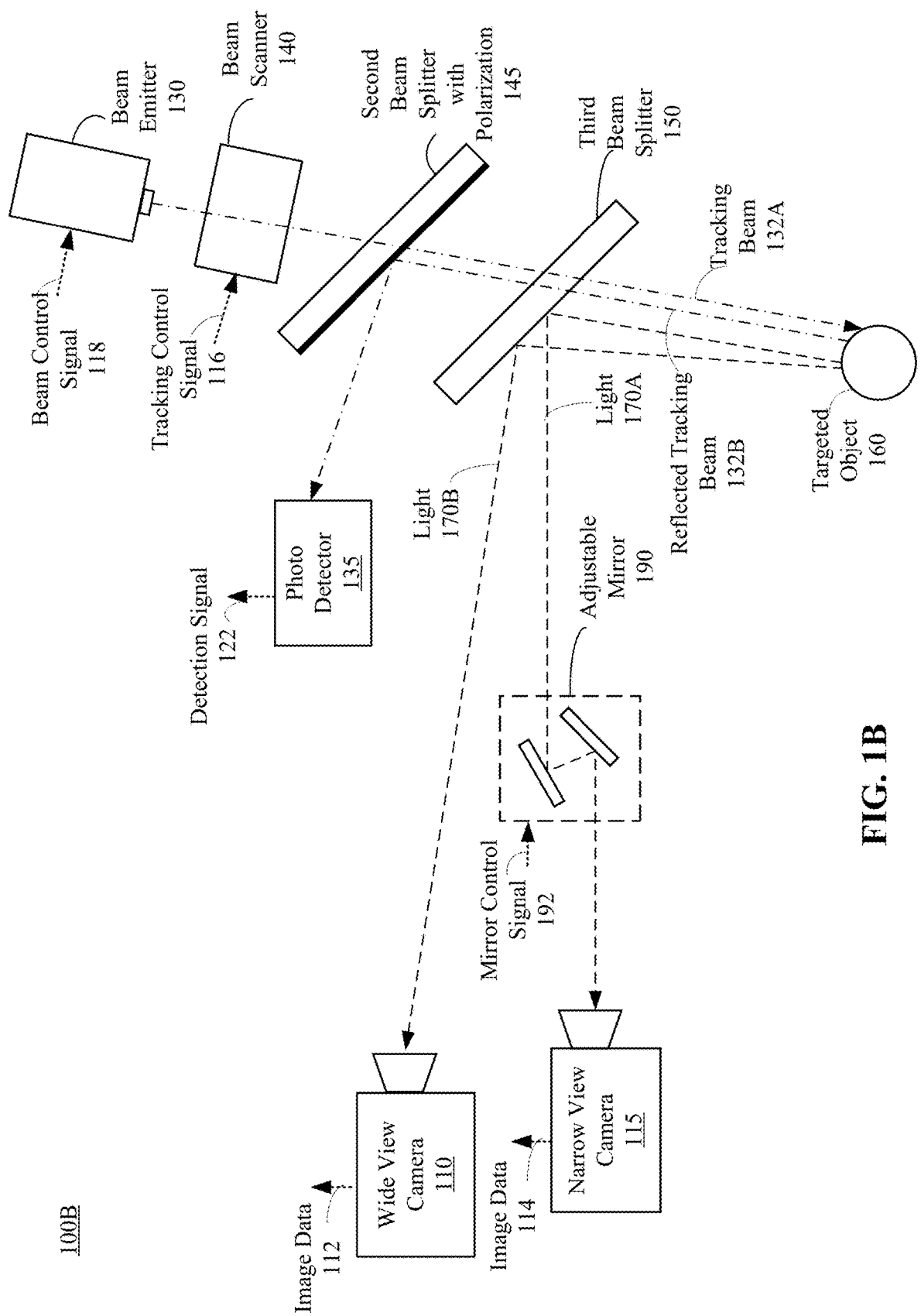
FIG. 1B is a schematic diagram of a vision based LIDAR system including two cameras and an adjustable mirror that controls a field of view of one of the cameras, in accordance with one embodiment.

FIG. 1B is a schematic diagram of a vision based LIDAR system including two cameras and an adjustable mirror that controls a field of view of one of the cameras, in accordance with one embodiment. The vision based LIDAR system 100B is a variation of the vision based LIDAR system 100A of FIG. 1A, and description for elements discussed above with respect to FIG. 1A is omitted to avoid redundancy. In the vision based LIDAR system 100B, the first beam splitter 120 illustrated in FIG. 1A may be removed, and an adjustable mirror 190 may be placed between the third beam splitter 150 and the narrow view camera 115. The adjustable mirror 190 includes one or more mirrors that change orientation based on the mirror control signal 192 and adjusts the field of view of the narrow view camera 115. The adjustable mirror 190 directs the light 170A representative of the targeted object 160 into the narrow view camera 115 to capture images 114 of the targeted object 160. Among other benefits, the vision based LIDAR system 100B can be used to analyze a greater number of objects because the field of view of the narrow view camera 115 can be adjusted to capture images of different areas in the environment using the adjustable mirror 190. In comparison, the narrow view camera 115 in the vision based LIDAR system 100A illustrated in FIG. 1A has a fixed field of view and is configured to capture images of a same area within the environment. The wide view camera 110 captures images 112 of the targeted object 160 using the light 170B that is reflected by the third beam splitter 150 and enters the wide view camera 110. The field of view of the wide view camera 110 is stationary.

Figure 1C:
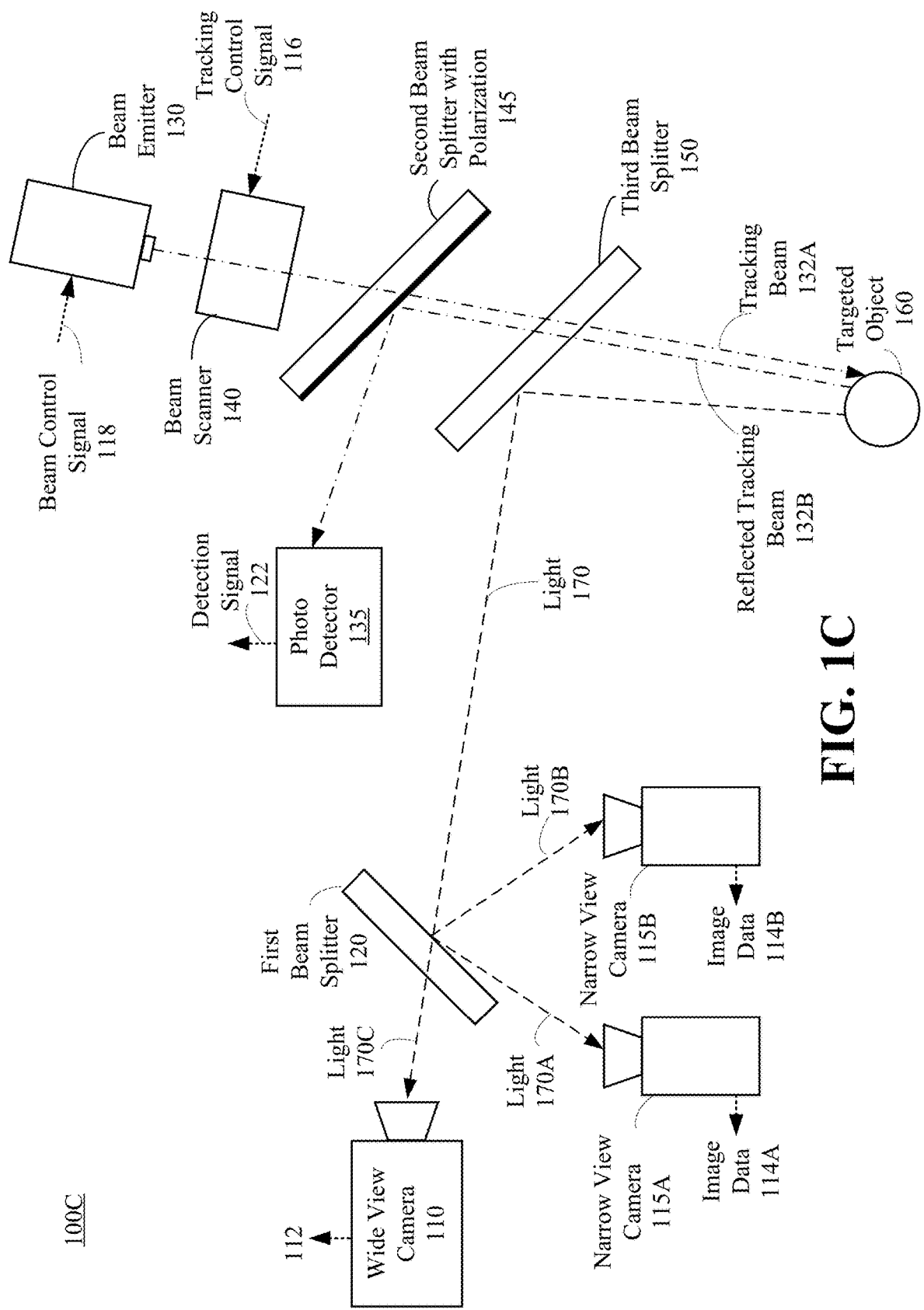
FIG. 1C is a schematic diagram of a vision based LIDAR system including three cameras, in accordance with one embodiment.

FIG. 1C is a schematic diagram of a vision based LIDAR system including three cameras, in accordance with one embodiment. The vision based LIDAR system 100C is another variation of the vision based LIDAR system 100A of FIG. 1A, and description for elements discussed above with respect to FIG. 1A is omitted to avoid redundancy. The vision based LIDAR system 100C may include a wide view camera 110 with a first FOV, a first narrow view camera 115A with a second FOV, and a second narrow view camera 115B with a third FOV different from the second FOV. Although the embodiment illustrated in FIG. 1C includes two narrow view cameras 115A,115B, the vision based LIDAR system 100C may be further modified to include additional narrow view cameras and/or other types of cameras. For example, the vision based LIDAR system 100C may include an intermediate camera with a field of view between that of a wide view camera 110 and a narrow view camera 115A, 115B.

Among other benefits, the vision based LIDAR system 100C may simultaneously capture detailed images of a plurality of targeted objects 160 that are located apart from each other. For example, another targeted objects 160 may be located at a distance from the targeted object 160 such that the other targeted object 160 does not lie within a field of view of the first narrow view camera 115A. Thus, the two targeted objects 160 cannot be captured simultaneously with just the first narrow view camera 115A. However, with the addition of the second narrow view camera 115B, the first narrow view camera 115 and the second narrow view camera 115B can each capture detailed images of one of the targeted objects 160. Thus, the vision based LIDAR system 100C can capture high resolution images of multiple targeted objects 160 of the environment at the same time.

Figure 2A:
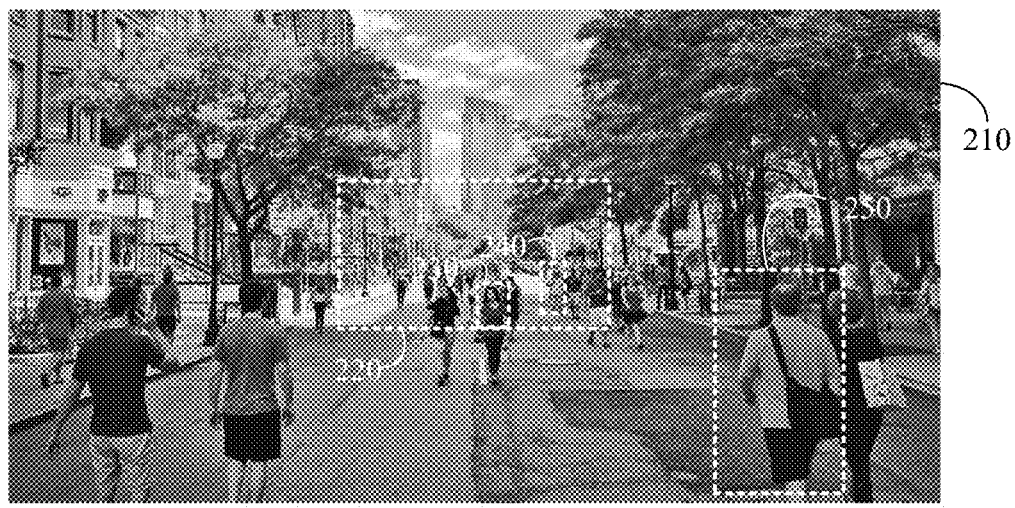
FIG. 2A is an example image of an environment captured by a wide view camera, in accordance with one embodiment.
Figure 2B:
FIG. 2B is an example image of an environment captured by a narrow view camera, in accordance with one embodiment.

FIG. 2A is an example image of an environment captured by a wide view camera, in accordance with one embodiment. The wide view image 210 corresponds to a wide FOV (e.g., 80 degrees) of a street captured by a wide view camera 110 of a vision based LIDAR system 100 (e.g., vision based LIDAR system 100A, 100B, or 100C). The wide view image 210 includes a plurality of candidate objects including streets, sidewalk, people, trees, buildings, stairs, lampposts, street signs, vehicles, animals, traffic light, and other objects. Because the wide view image 210 covers a wide area, it is useful for identifying a large number of candidate objects at once and determining overall context of the environment. In contrast, FIG. 2B is an example image of the environment captured by a narrow view camera, in accordance with one embodiment. The narrow view image 220 corresponds to a narrow FOV (e.g., 3 degrees) captured by a narrow view camera 115. The narrow FOV of the narrow view image 220 is included in the wide FOV of the wide view image 210. The narrow view image 220 provides high resolution image data of a subset of the candidate objects captured in the wide view image 210, which can be used to determine additional details on the subset.

In some embodiments, the wide view image 210 may be provided to an object recognition model to identify candidate objects captured in the wide view image 210 and pixel locations of the candidate objects within the wide view image 210 to predict locations of the candidate objects in the real-world. Based on the wide view image 210, the object recognition model may detect presence of the candidate objects and output a preliminary identification and pixel locations or a bounding box for each of the candidate objects. A candidate object may be any object that is captured in the wide view image 210 and identified using the object recognition model. Some of the candidate objects may be selected as targeted objects and tracked using the tracking beam 132A while other candidate objects may be identified by the object recognition model but not tracked by the vision based tracking system 100. The preliminary identification may be a determined object type of the candidate object, and the pixel locations or the bounding box may indicate a region of the wide view image 210 that includes pixels associated with the candidate object.

In some embodiments, the object recognition model may also output a confidence score associated with the preliminary identification of each candidate object. The confidence score is indicative of the confidence that the object recognition model has that the preliminary identification is correct. In some embodiments, the vision based LIDAR system 100 may determine whether to use the narrow view image 220 to analyze a candidate object based on the confidence score. If the candidate object identified in the wide view image 210 is also captured within the narrow FOV corresponding to the narrow view image 220 and the confidence score of the identification based on the wide view image 210 is below a predetermined threshold, the vision based LIDAR system 100 may then apply the object recognition model on the narrow view image 220 including the candidate object to improve the confidence score of the identification. Because the narrow view image 220 has a higher resolution than the wide view image 210, the object recognition model may improve its prediction of the candidate object.

In some embodiments, even if a candidate object is within the narrow FOV, the vision based LIDAR system 100 may not use the narrow view image 220 to identify the candidate object. If the confidence score associated with the identification of the candidate object made with the wide view image 210 exceeds the predetermined threshold, the vision based LIDAR system may skip analyzing the narrow view image 220. By analyzing less image data, the vision based LIDAR system 100 may conserve time and computational resources. In other embodiments, when a candidate object is captured within a plurality of images corresponding to different resolutions, the vision based LIDAR system 100 may select an image with the highest resolution for identifying the candidate object.

In some embodiments, the narrow view image 220 may also be provided to the object recognition model in parallel with the wide view image 210. The object recognition model may simultaneously identify candidate objects from both the wide view image 210 and the narrow view image 220. The vision based LIDAR system 100 may use the wide view image 210 for initial detection of the candidate objects and use the narrow view image 220 for detailed image processing.

From the candidate objects identified by the object recognition model in the wide view image 210 and/or the narrow view image 220, a targeted object 230 may be selected. The targeted object 230 may be selected based on a set of criteria selected by a user. For example, the vision assisted LIDAR system 100 may be used to search for particular types of objects (e.g., people, cars, packages). In some embodiments, the confidence scores of the candidate objects may be used to select the targeted object to be analyzed further by the vision based LIDAR system 100. For example, the vision based LIDAR system 100 may select the targeted object among one or more candidate objects associated with confidence scores below a predetermined threshold.

In some embodiments, a first targeted object 230 may be included in both the wide view image 210 and the narrow view image 220. The vision based LIDAR system 100 may apply the object recognition model on at least one of the images to identify the first targeted object 230. In some embodiments, the vision based LIDAR system 100 may identify the first targeted object 230 using the wide view image 210 and not the narrow view image 220. Because the first targeted object 230 is located within a threshold distance to the wide view camera 110, the vision based LIDAR system 100 may be able to gather sufficient information about the first targeted object 230 to identify the type of the first targeted object 230 and its pixel locations for directing the tracking beam onto the first targeted object 230. In other embodiments, the vision based LIDAR system 100 may select the narrow view image 220 for identifying the first targeted object 230 since it has a higher resolution than the wide view image 210. Alternatively, the vision based LIDAR system 100 may use both the wide view image 210 and the narrow view image 220 for the object recognition model.

In some embodiments, a second targeted object 240 may also be included in both the wide view image 210 and the narrow view image 220. However, the second targeted object 240 is located farther away from the vision based LIDAR system at the time the images are captured, and the second targeted object 240 is represented with fewer pixels compared to the first targeted object 230. As such, the vision based LIDAR system 100 may use the narrow view image 220 for identifying the second targeted object 240 instead of the wide view image 210.

In some embodiments, the narrow view image 220 may cover a different portion of the wide view image 210 than what is illustrated in FIGS. 2A-2B. For example, the FOV of the narrow view camera 115 may be directed at a different area of the environment by the adjustable mirror 190. That is, instead of covering a center region of the wide view image 210, the narrow view image 220 captured by the narrow view camera 115 may be offset. As described with respect to FIG. 1B, the FOV of the narrow view camera 115 may be changed to cover a different region using the adjustable mirror 190. For example, the FOV of the narrow view camera 115 may be adjusted to cover the bottom right corner of the wide view image 210 to capture a third targeted object 250 that previous was not covered by the narrow view camera 115.

Figure 3:
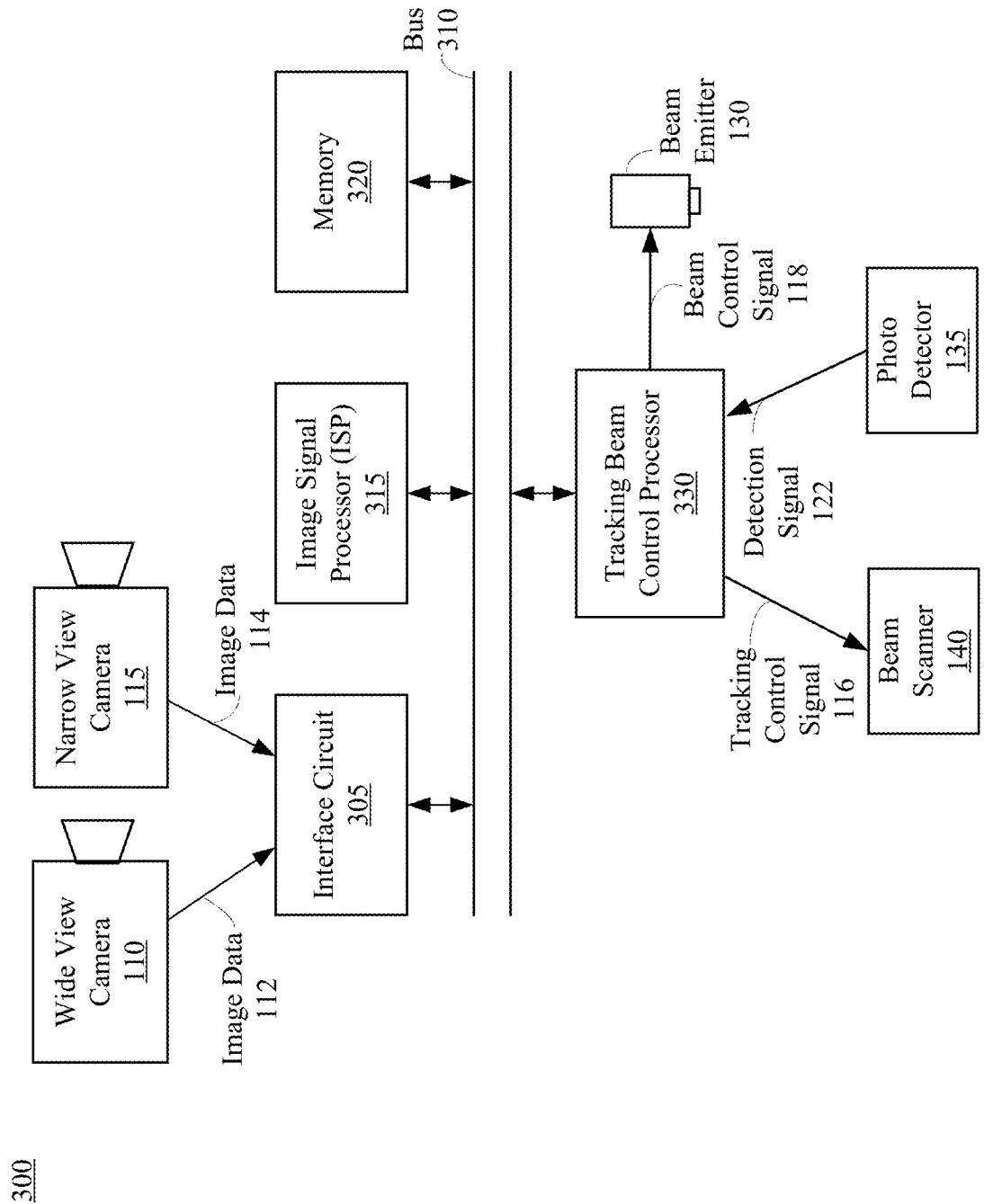
FIG. 3 is a block diagram illustrating a computing system for operating a vision based LIDAR system, in accordance with one embodiment.

FIG. 3 is a block diagram illustrating a computing system for operating a vision based LIDAR system, in accordance with one embodiment. The computing system 300 includes a wide view camera 110, a narrow view camera 115, an interface circuit 305, an image processing signal processor (ISP) 315, a memory 320, and a tracking beam control processor 330, a beam emitter 130, a photo detector 135, and a beam scanner 140. Other embodiments of the computing system 300 may have different architecture.

The wide view camera 110 and the narrow view camera 115 (also collectively referred to as "cameras 110, 115" herein) capture images and provide image data 112, 114 to the interface circuit 305 that connects the cameras 110, 115 to the bus 310. The bus 310 may be used to facilitate communication about the ISP 315, the memory 320, and the tracking beam control processor 330, for example, according to inter-integrated circuit (IC2) protocol or serial peripheral protocol (SPI). In some embodiments, the image data 112, 114 from the wide view camera 110 and the narrow view camera 115 may be provided to the ISP 315 without the bus 310.

The ISP 315 performs image signal processing on the image data 112, 114 received from the wide view camera 110 and the narrow view camera 115 through the interface circuit 305. The ISP 315 may identify candidate objects in the image data 112, 114 using, for example, one or more edge detection, deep learning, Hough transform, Kalman filter, spatial filter, temporal filter, and other object recognition methods to identify and localize the candidate objects. The ISP 315 may perform different image signal processing methods depending on the type of candidate objects being identified. The ISP 315 may also perform cropping, scaling, generating motion vector, autofocus control or image enhancement to improve accuracy of the object identification and compensate for blurriness, distortion, and/or incorrect position. In some embodiments, low level computing such as applying pre-processing filters to the images may be performed by the wide view camera 110, narrow view camera 115, and/or the interface circuit 305. The ISP 315 is connected to the memory 320 via the bus 310.

The memory 320 stores data and instructions until read by the ISP 315. The memory 320 may be a dynamic random-access memory (DRAM). Details on the memory 320 is described with respect to FIG. 4.

The tracking beam control processor 330 is connected to the beam emitter 130, the photo detector 135, and the beam scanner 140. The tracking beam control processor 330 generates the beam control signal 118 to instruct the beam emitter 130 to emit one or more tracking beams 132A and generates the tracking control signal 116 to the beam scanner 140 to move light guiding elements such as mirrors in the beam scanner 140 to direct the one or more tracking beams 132A onto the targeted object 160. The tracking beam control processor 330 receives the detection signal 122 from the photo detector 135 that detects at least a portion of the emitted one or more tracking beams 132B that is reflected by the targeted object 160. Based on the detection signal 122, the tracking beam control processor 330 may determine distances to one or more spots on the targeted object 160, and the distances may be used for updating the identification of the targeted object 160.

Figure 4:
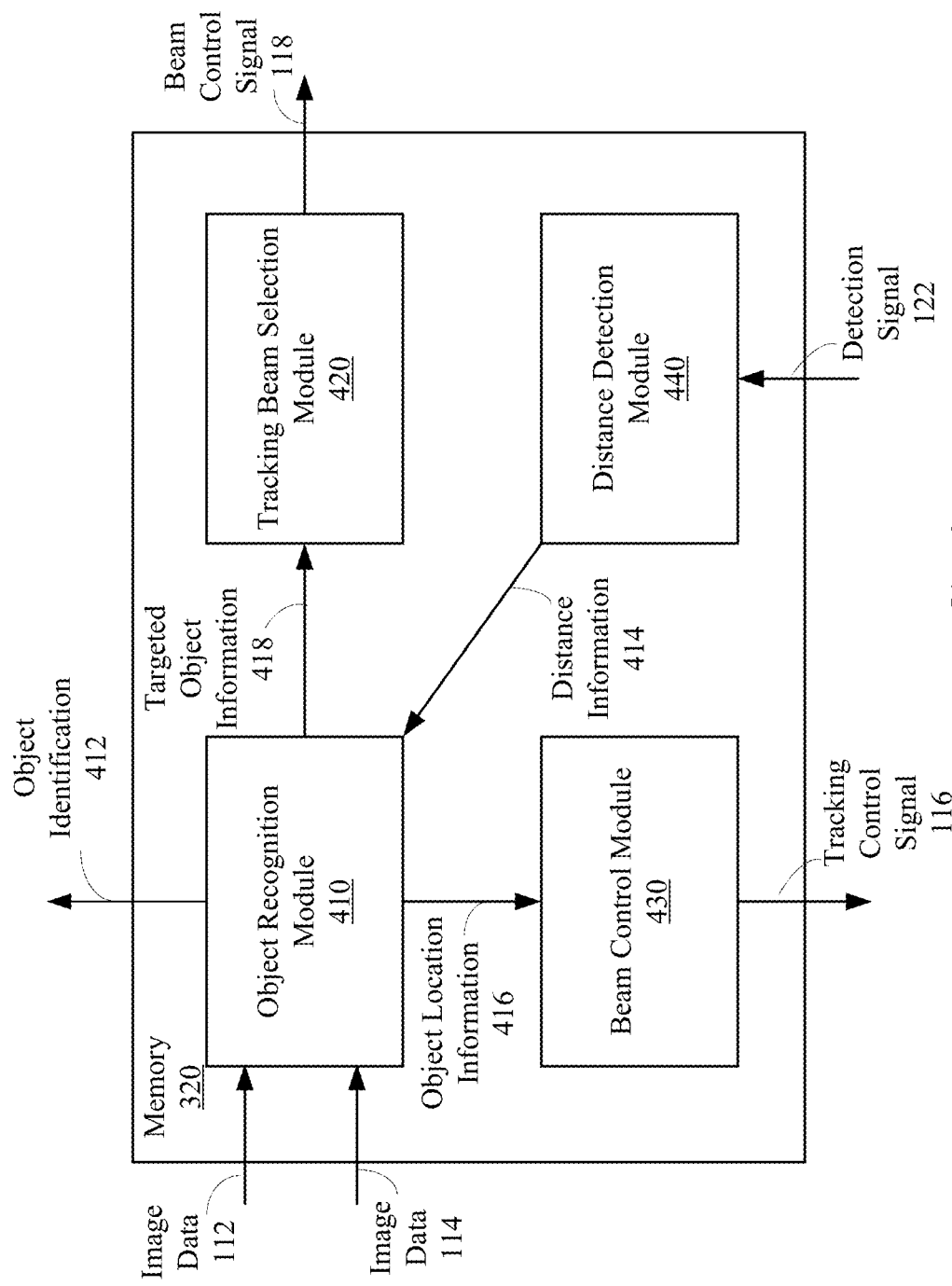
FIG. 4 is a block diagram illustrating a memory of a vision based LIDAR system, in accordance with one embodiment.

FIG. 4 is a block diagram illustrating a memory of a vision based LIDAR system, in accordance with one embodiment. The memory 320 includes an object recognition module 410, a tracking beam selection module 420, a beam control module 430, and a distance detection module 440. Other embodiments of the memory 320 may have different and/or additional modules.

The object recognition module 410 is a computer model that identifies candidate objects and pixel locations of the candidate objects within one or more images. The object recognition module 410 may receive the image data 112 corresponding to first images from the wide view camera 110 and the image data 114 corresponding to second images from the narrow view camera 115 and identify candidate objects that are captured in the first images and/or second images. The object recognition module 410 includes a computer model that identifies features in the first and second images 112, 114 and identify candidate objects based on the identified features. For example, the object recognition module 410 may identify a type of object (e.g., identify a label "car" for a portion of the image) and pixel locations or bounding box of the candidate object in an image. The object recognition module 410 may be implemented as a plurality of models that operate sequentially or in parallel to identify the candidate objects. For example, multiple models may operate in parallel to identify different kinds of candidate objects.

The object recognition module 410 may be implemented as a variety of machine-learned models or trainable networks. For example, the object recognition module 410 may be a neural network, decision tree, classifier, or other type of computer model, and any combination thereof, that identifies candidate objects in the images 112,114 provided to the object recognition module 140. The object recognition module 410 may be trained from a set of training data to learn weights and parameters for effectively performing the identification. The training data may include images of annotated objects and known dimensions of the annotated objects. The complexity of these networks and input resolution of images to the network may affect the processing time and accuracy of the object recognition module 410.

Based on the detected candidate objects, the object recognition module 410 selects a targeted object to be analyzed further by determining one or more distances to the targeted object. The object recognition module 410 may output targeted object information 418 including characteristics of the targeted object 160 extracted from the image data 112, 114 to the tracking beam selection module 420. The targeted object information 418 may include a preliminary identification of the targeted object 160, which is the object type predicted by the object recognition module 410. The object recognition module 410 may also output information associated with other candidate objects near the targeted object 160.

Although not illustrated in FIG. 4, the object recognition module 410 may further generate the mirror control signal 192 used to control the adjustable mirror 190 in the vision based LIDAR system 100B of FIG. 1B. The object recognition module 410 may perform image recognition on the image data 112 from the wide view camera 110 and determine a region of interest. For example, the region of interest includes the targeted object 160, and the object recognition module 410 may generate the mirror control signal 192 to cause the adjustable mirror 190 to shift the FOV of the narrow view camera 115 to include the region of interest. The narrow view camera 115 may then capture images 114 of the targeted object 160 in the region of interest in higher resolution and provide the images 114 to the object recognition module 410 for identification.

The tracking beam selection module 420 determines parameters of the tracking beam 132A used to determine a distance to a targeted object 160 based on the targeted object information 418 from the object recognition module 410. Based on the determined parameters, the tracking beam selection module 420 generates the beam control signal 118 that is provided to the beam emitter 130. The beam control signal 118 may be generated based on the preliminary identification of the targeted object 160. For example, if the targeted object 160 is predicted to be an object that is sensitive to high intensity beams (e.g., an animal, a human), the beam emitter 130 may emit a low intensity tracking beam 132A (e.g., avoid emitting high intensity tracking beam if the targeted object 160 is an animal or a human for eye safety). Alternatively, the beam control signal 118 may be generated based on presence of candidate object within the images 112, 114. That is, the tracking beam selection module 420 may receive identification of candidate objects that are not the targeted object 160, and if one or more of the candidate objects are determined to be sensitive to high intensity beams, the beam control signal 118 may emit a lower intensity tracking beam 132A to avoid accidental harm to a candidate object nearby. Adjusting parameters of the tracking beam 132A allows the vision based LIDAR system 100 to operate more safely.

In some embodiments, the tracking beam selection module 420 may generate the beam control signal 118 based on a predicted location of the targeted object 160. For example, if the object recognition module 410 is unable to identify the targeted object 160 from the images 112 from the wide view camera 110 but identifies the targeted object 160 from the images 114 from the narrow view camera 115, it indicates that the targeted object 160 is located at a distance farther than a threshold distance from the vision based LIDAR system. When the targeted object 160 is located farther than the threshold distance, the vision based LIDAR system may require a higher intensity tracking beam 132A to reach the targeted object 160. Conversely, if the object recognition module 410 identifies the targeted object 160 from the images 112 from the wide view camera 110 with a confidence score exceeding the predetermined threshold, the targeted object 160 is likely to be within the threshold distance that can be detected using a lower intensity tracking beam. By using high intensity tracking beam 132A as necessary instead of by default, the beam control signal 118 may reduce power consumption of the vision based LIDAR system.

The beam control module 430 generates the tracking control signal 116 that is provided to the beam scanner 140 to direct the tracking beam 132A onto the targeted object 160. The beam control module 430 receives object location information 416 which may be one or more pixels locations associated with the targeted object 160 or a boundary box around the targeted object 160. The beam control module 430 may select one or more spots on the targeted object 160 to direct the targeting beam onto based on the object location information 416.

In some embodiments, the beam control module 430 may select a single spot such as a center of the targeted object 160 to direct the target beam. In other embodiments, the tracking beam 132A may be directed onto a plurality of spots that form a grid on the targeted object 160. The tracking beam 132A may be projected as multiple light points or a point cloud onto the targeted object 160 by generating the control signal 116 to control the beam scanner 140 to direct the tracking beam 132A to different spots on the targeted object 160. Such projection of the multiple light points or point cloud may occur during a single frame capture time of the wide view camera 110 and/or the narrow view camera 115. In yet another embodiment, the beam emitter 130 may include a plurality of beam sources that emit a plurality of tracking beams 132A via different light paths simultaneously onto the targeted object 160, for example, in a grid pattern. If the grid of tracking beams 132A is of a sufficient resolution, the beam scanner 140 may be omitted. The beam emitter 130 may be embodied, for example, as a vertical cavity surface emitting laser (VCSEL) that simultaneously emits multiple tracking beams 132A.

The distance detection module 440 receives the detection signal 122 generated by the photo detector 135 responsive to detecting at least a portion of the tracking beam 132A that is reflected by the targeted object 160. The detection signal 122 indicates a time at which the photo detector 135 detected the reflected tracking beam 132B. The distance detection module 440 calculates the distance to the targeted object 160 based on an elapsed time between a time at which the tracking beam 132A is emitted and a time at which the reflected tracking beam 132B is detected. The distance detection module 440 generates distance information 414 including distances to the one or more spots on the targeted object 160 and provides the distance information 414 to the object recognition module 410.

The object recognition module 410 receives the distance information 414 from the distance detection module 440 and repeats object recognition on the image data 112, 114 based on the distance information 414. Based on the distance information 414, the object recognition module 410 may update the location and motion trajectory associated with the targeted object 160. In some embodiments, the object recognition module 410 may determine that the object type of the targeted object 160 is different from the preliminary results determined from the image data 112, 114 without the distance information 414. In some embodiments, the object recognition module 410 may determine that the object type of the targeted object 160 is the same, but the confidence score associated with the identification may be higher with the distance information 414. In some embodiments, the object recognition module 410 may further determine an orientation of the targeted object 160.

Figure 5:
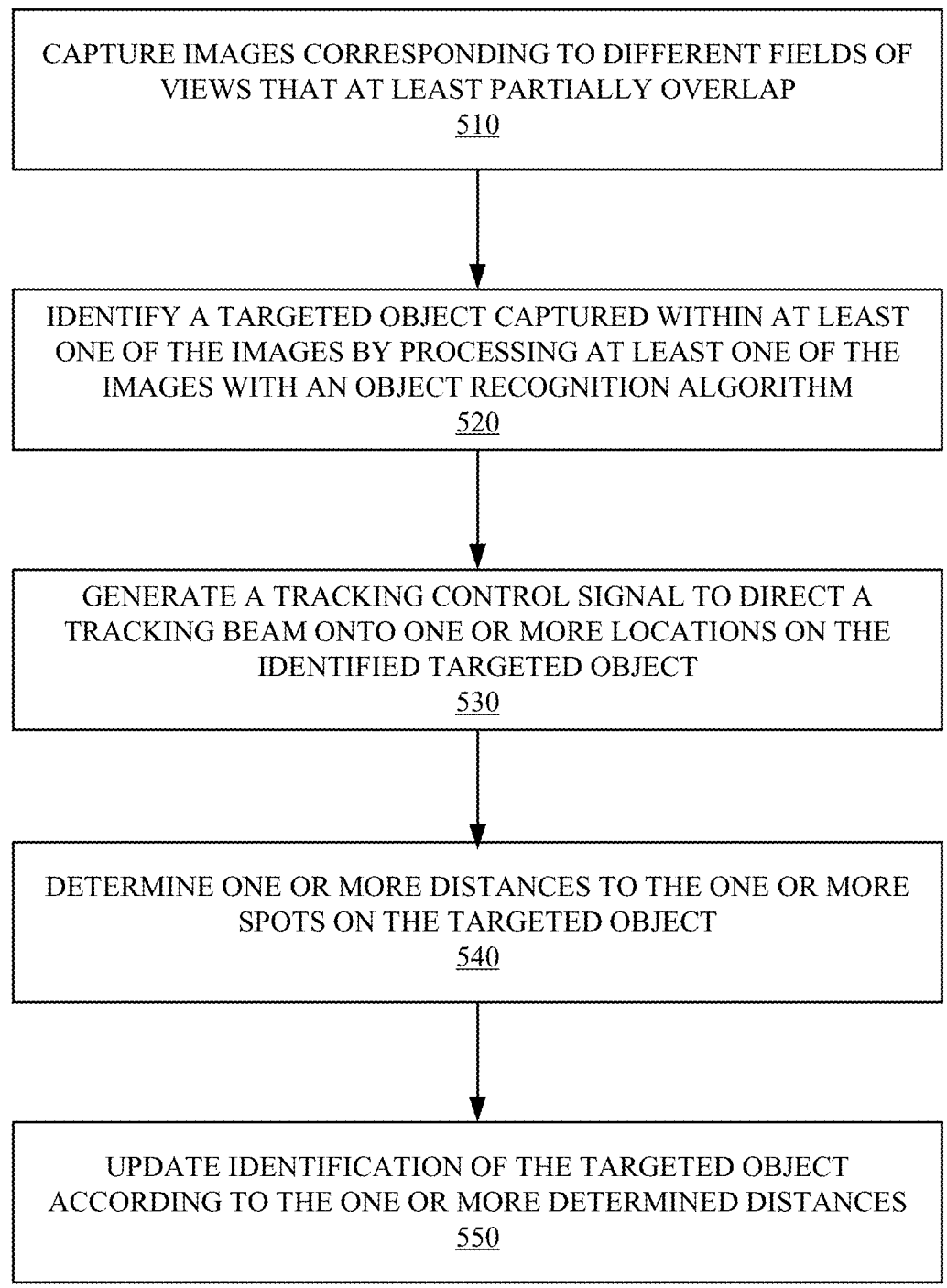
FIG. 5 is a flowchart depicting a process of operating a vision based LIDAR system, in accordance with one embodiment.

FIG. 5 is a flowchart depicting a process of operating a vision based LIDAR system, in accordance with one embodiment. A vision based LIDAR system captures 510 images corresponding to different fields of views that at least partially overlap using a plurality of cameras. The vision based LIDAR system may include one or more cameras with different fields of view. For example, the vision based LIDAR system may include a wide view camera corresponding to a first FOV (e.g., 80 degrees) and a narrow view camera corresponding to a second FOV (e.g., 3 degrees) narrower than the first field of view. The vision based LIDAR system may include additional narrow view cameras and/or an intermediate camera corresponding to a third FOV (e.g., 10 degrees) that is between the first FOV and the second FOV.

The vision based LIDAR system identifies 520 a targeted object captured within at least one of the images by processing at least one of the images with an object recognition model. To identify the targeted object, the object recognition model may perform image processing on the at least one of the images and identify a plurality of candidate objects that are present. The identification of the plurality of candidate objects include predicting the types of the plurality of candidate objects and pixel locations or boundary boxes associated with the candidate objects. The targeted object may be selected from the plurality of candidate objects.

The vision based LIDAR system generates 530 a tracking control signal to direct a tracking beam onto one or more spots on the identified targeted object. The vision based LIDAR system determines a distance to the targeted object using a distance sensor including a beam emitter and a photo detector. The beam emitter emits the tracking beam and the vision based LIDAR system directs the tracking beam toward the targeted objecting using a beam scanner. The beam scanner includes adjustable mirrors that change orientation according to the tracking control signal such that the tracking beam may be directed onto the one or more spots on the identified targeted object. The one or more spots may form a grid on the targeted object.

The vision based LIDAR system determines 540 one or more distances to the one or more spots on the targeted objects. After the tracking beam is incident on the surface of the targeted object, at least a portion of the tracking beam is reflected. The reflected tracking beam is detected by the photo detector of the distance sensor and the detection is used to determine the one or more distances.

The vision based LIDAR system updates 550 the identification of the targeted object according to the one or more determined distances. The vision based LIDAR system can only extract information in two dimensions from images. However, using the tracking beam, the vision based LIDAR system can determine the one or more determined distances to the targeted object and collect information from a third dimension. The vision based LIDAR system may provide the one or more distances to the object recognition algorithm to improve the identification results.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

What is claimed is:

1. An object recognition apparatus comprising:
    a plurality of global shutter cameras configured to generate images corresponding to different fields of view that at least partially overlap;
    a beam scanner configured to direct a tracking beam onto one or more spots on a targeted object according to a tracking control signal received by the beam scanner to control the beam scanner, the targeted object included in at least one of the images;
    a photo detector configured to detect a portion of the tracking beam reflected from the one or more spots on the targeted object;
    a first beam splitter between the beam scanner and the targeted object, the first beam splitter configured to forward the tracking beam from the beam scanner to the targeted object, and forward light of the fields of view to the plurality of global shutter cameras;
    a second beam splitter between the first beam splitter and the beam scanner, the second beam splitter configured to forward the tracking beam from the beam scanner to the first beam splitter, and forward the portion of the tracking beam from the first beam splitter to the photo detector; and
    a processor operably coupled to the plurality of global shutter cameras, the beam scanner, and the photo detector, the processor configured to:
        identify the targeted object within the at least one of the images by processing the at least one of the images with an object recognition model,
        generate the tracking control signal to cause the beam scanner to direct the tracking beam to the one or more spots on the targeted object,
        determine one or more distances to the one or more spots on the targeted object, and
        update identification of the targeted object according to the one or more determined distances.

2. The object recognition apparatus of claim 1, wherein, responsive to the at least one of the images including the targeted object with different resolutions, using an image of the at least one of the images with a highest resolution to identify the targeted object.

3. The object recognition apparatus of claim 1, further comprising a beam emitter configured to generate the tracking beam with adjustable beam intensity according to a beam control signal indicating an adjustment to one or more parameters of the tracking beam, and wherein the processor is configured to decreases the beam intensity responsive to determining presence of an animal or a human in the at least one of the images.

4. The object recognition apparatus of claim 1, wherein a first global shutter camera of the plurality of global shutter cameras has a first field of view and a second global shutter camera of the plurality of global shutter cameras has a second field of view within the first field of view.

5. The object recognition apparatus of claim 1, further comprising an adjustable mirror in a path of light between one of the plurality of global shutter cameras and the targeted object, the adjustable mirror configured to adjust a field of view of one of the global shutter cameras according to a mirror control signal to capture an image including the targeted object.

6. The object recognition apparatus of claim 1, wherein the processor is configured to generate the tracking control signal by identifying one or more pixels corresponding to one or more pixel locations in the at least one of the images including the targeted object.

7. A method comprising:
receiving light representing images of different fields of view by a first beam splitter, the different fields of view at least partially overlapping;
forwarding the light to a plurality of global shutter cameras by the first beam splitter;
capturing the images corresponding to the different fields of view using the plurality of global shutter cameras;
identifying a targeted object captured within at least one of the images of different fields of view by processing at least one of the images with an object recognition model;
generating a tracking control signal to direct a tracking beam onto one or more spots on the identified targeted object
controlling a beam scanner according to the tracking control signal to direct the tracking beam;
forwarding the tracking beam from the beam scanner to the first beam splitter by a second beam splitter between the first beam splitter and the beam scanner;
forwarding a portion of the tracking beam reflected from the one or more spots on the identified targeted object by the second beam splitter;
determining one or more distances to the one or more spots on the targeted object based on the portion of the tracking beam reflected from the one or more spots on the targeted object; and
updating identification of the targeted object according to the one or more determined distances.

8. The method of claim 7, wherein responsive to two or more of the images including the targeted object having different resolutions, using an image of the at least one of the images with a highest resolution for identifying the targeted object.

9. The method of claim 7, further comprising:
detecting presence of an animal or a human in the at least one of the images; and
decreasing an intensity of the tracking beam responsive to detecting the presence of candidate objects in the at least one of the images.

10. The method of claim 7, wherein a first sensor of the plurality of global shutter cameras has a first field of view and a second sensor of the plurality of global shutter cameras has a second field of view within the first field of view.

11. The method of claim 7, further comprising:
generating a mirror control signal by a processor to adjust an orientation of an adjustable mirror disposed in a path of light between the plurality of global shutter cameras and the targeted object.

12. The method of claim 7, wherein the tracking control signal is generated by identifying one or more pixels corresponding to one or more pixel locations in the at least one of the images including the targeted object.

13. A non-transitory computer-readable medium storing instructions, that when executed by one or more processors cause the one or more processors to:
receive images from a plurality of global shutter cameras, the images corresponding to different fields of views that at least partially overlap, light representing the images received by a beam splitter and send to the plurality of global shutter cameras;
identify a targeted object captured within at least one of the images by processing the at least one of the images with an object recognition model;
generate a tracking control signal to direct a tracking beam onto one or more spots on the identified targeted object via the beam splitter, the tracking control beam controlling a beam scanner to direct the tracking beam;
determine one or more distances to the one or more spots on the targeted object based on a portion of the tracking beam reflected from the one or more spots on the targeted object; and
update identification of the targeted object according to the one or more determined distances.

14. The object recognition apparatus of claim 1, wherein the second beam splitter comprises one or more filters that transmit the tracking beam or the portion of the tracking beam reflected from the one or more spots but reflects light to the plurality of global shutter cameras.

15. The object recognition apparatus of claim 1, wherein the processor is further configured to:
preliminarily identify candidate objects using a first image of the images, and
identify the targeted object from the identified candidate objects using a second image of the images having a narrower field of view than the first image.

16. The object recognition apparatus of claim 15, wherein the candidate objects are indicated by pixel locations or bounding boxes.

17. The object recognition apparatus of claim 15, wherein the processor is further configured to:
generate a confidence score of the preliminarily identify candidate objects, and
skip the identifying of the targeted object using the second image responsive to the confidence score exceed a predetermined threshold.

18. The object recognition apparatus of claim 1, further comprising a beam emitter configured to generate the tracking beam with adjustable beam intensity according to a beam control signal indicating an adjustment to one or more parameters of the tracking beam, and wherein the processor is configured to increases the beam intensity responsive to determining that the targeted object is located father than a threshold distance.

19. The object recognition apparatus of claim 1, wherein the beam scanner is configured to direct the tracking beams to a plurality spots on the targeted object during a single frame capture time of one or more of the global shutter cameras.

20. The method of claim 7, further comprising:
preliminarily identifying candidate objects using a first image of the images; and
identifying the targeted object from the identified candidate objects using a second image of the images having a narrower field of view than the first image.

* * * * *